Aug. 11, 1936.  S. BUJNICKI  2,050,920
WINDSHIELD WIPER ATTACHMENT
Filed March 20, 1935
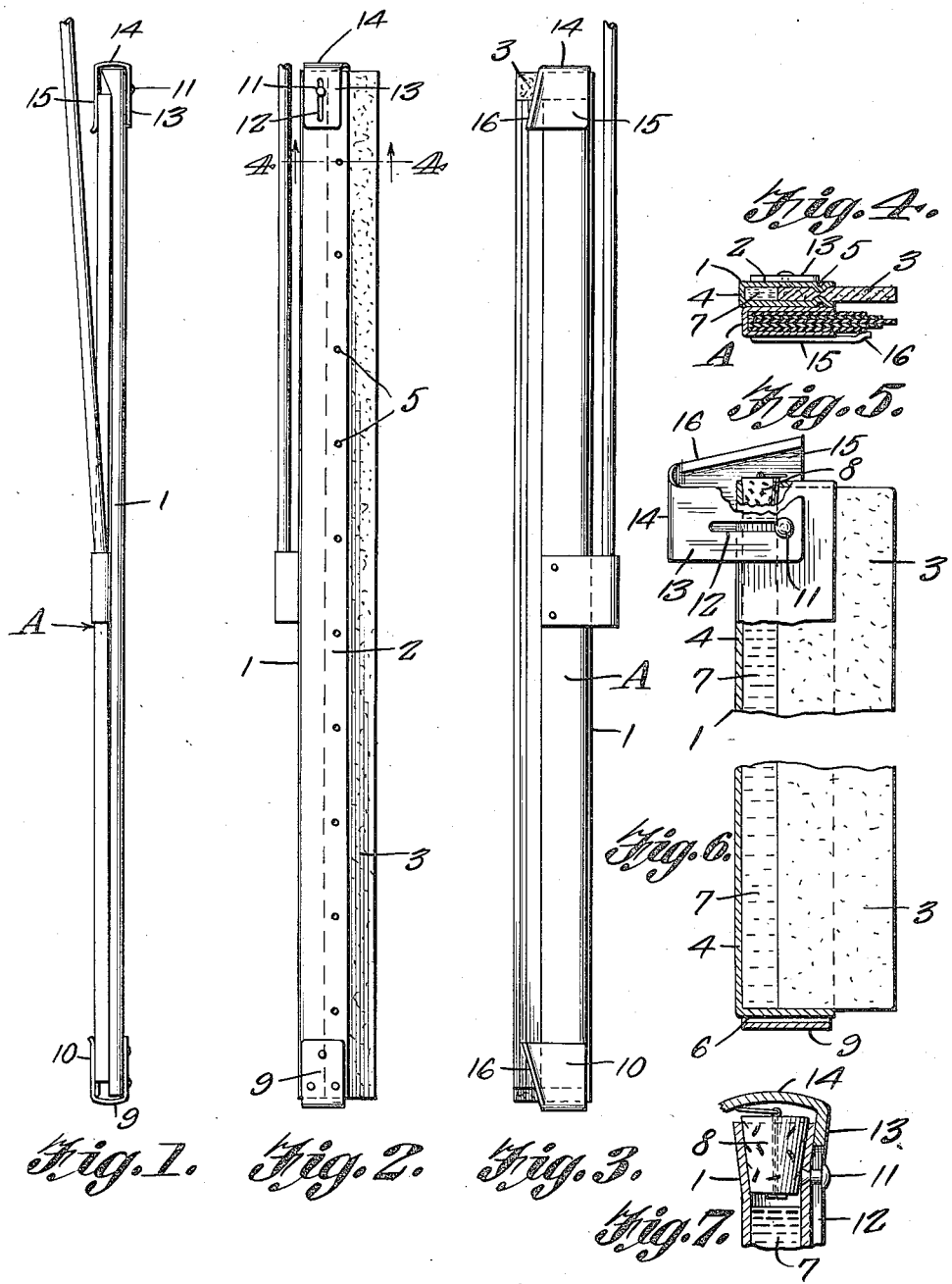
Sigismund Bujnicki, INVENTOR Patented Aug. 11, 1936

2,050,920

UNITED STATES PATENT OFFICE 2,050,920

WINDSHIELD WIPER ATTACHMENT

Sigismund Bujnicki, Newark, N. J.

Application March 20, 1935, Serial No. 12,078

2 Claims. (Cl. 15—250)

This invention relates to windshield wipers and its general object is to provide an attachment to be carried by a wiper and which spreads anti-freezing fluid on the windshield to prevent moisture and water from freezing thereon and snow or the like adhering thereto, in order to provide clear vision at all times, regardless of the weather temperature and elements.

A further object of the invention is to provide a windshield attachment of the character set forth, that can be easily and expeditiously applied and removed with respect to all types of wiper blades, is of the reservoir type, can be refilled with anti-freezing fluid with very little effort, is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a front view illustrating the application of my attachment to a windshield wiper blade.

Figure 2 is a side view thereof.

Figure 3 is a view taken on the opposite side of Figure 2.

Figure 4 is a sectional view taken approximately on line 4—4 of Figure 2, looking in the direction of the arrows.

Figure 5 is a fragmentary longitudinal sectional view of the upper portion of the attachment, with the upper or movable clamping element disposed out of clamping position.

Figure 6 is a similar view of the lower portion of the attachment.

Figure 7 is a fragmentary sectional view showing the movable clamping element in operative position and illustrates the upper end of the reservoir and the stopper therefor.

Referring to the drawing in detail, the letter A indicates a windshield wiper blade of the usual construction and to which is attached the attachment which forms the subject matter of the present invention, to be carried thereby.

The attachment includes a body 1 of elongated formation and which is preferably longer than the wiper blade A as shown in Figure 1, but in any event is substantially U-shape in cross section to provide spaced parallel clamping side members 2 which have clamped between the same a strip 3 of absorbing material such as felt or the like, and the strip is held between the members 2 in a manner to be spaced from the wall 4 by prongs 5 provided by forming indentations in the side members, as best shown in Figure 4 so that the prongs penetrate the strip 3. The strip 3 of course extends outwardly beyond the outer edges of the side members 2, so as to be disposed flush with the outer edge of the outermost wiper element of the blade A, when the attachment is secured to the blade in a manner which will be presently described.

The body is provided with a closed lower end 6, and this end together with the wall 4 and the inner side of the strip 3 provides a reservoir 7 for the purpose of receiving anti-freezing fluid, oil or the like, which of course will naturally be absorbed by the strip 3 by capillary action, and the upper end of the side members 2 and the rear wall 4 are outwardly flared for the purpose of providing a neck for a stopper 8 and so that the fluid can be easily poured within the reservoir. The stopper is provided with a handle which includes means extending through the same, and the handle portion thereof is pivotally secured to the means and may be in the form of a ring.

Secured to the lower end of the body is a substantially U-shaped clamping member 9 that is fixed thereto, and the arm 10 thereof is spaced with respect to the body to receive the lower end of the wiper blade.

Extending from the upper end of the body is a headed pin 11 which is received in a slot 12 of one arm 13 of the upper clamping element 14 which is likewise of U-shape configuration and the arm 15 thereof is spaced from the body 1 for the purpose of receiving the wiper blade. However, the clamping element 14 is movable due to the pin and slot connection, and it will be obvious that the clamping element 14 is slidably mounted on the pin to be lifted from the position of Figure 7 and pivotally moved to the position of Figure 5, so that access can be had to the stopper. When the clamping element 14 is in its operative position, or as shown in Figure 7, and the attachment is secured to the wiper blade, casual removal of the stopper is practically impossible, as will be apparent upon inspection of Figures 1, 2, and 3. Each of the clamping elements or U-shaped members 9 and 14 have their free arms provided with outwardly flared portions 16 to provide what may be termed handles to facilitate the application and removal of the attachment to the wiper.

From the above description and disclosure of the drawing, it will be obvious that I have provided a windshield wiper attachment that is carried by the blade thereof and which will spread anti-freezing fluid on the windshield for the purpose set forth, consequently the attachment together with the wiper blade willl provide clear vision at all times.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A windshield wiper attachment comprising an elongated body of cross sectional U-shape configuration to provide spaced parallel clamping side members, a strip of absorbing material clamped between the side members and extending outwardly beyond the same, a closed bottom and an open upper end for the body, said strip cooperating with the body and its bottom to provide a reservoir, a stopper for the open upper end, clamping means at the upper and lower ends of the body for securing the attachment to the blade of the wiper and means for securing the upper clamping means to the body for movement to positions to cover and uncover the stopper.

2. A windshield wiper attachment comprising an elongated body of cross sectional U-shape configuration to provide spaced parallel clamping side members, a strip of absorbing material clamped between the side members and extending outwardly beyond the same, a closed bottom and an open upper end for the body, said strip cooperating with the body and its bottom to provide a reservoir, a stopper for the open upper end, clamping means at the upper and lower ends of the body for securing the attachment to the blade of the wiper, a pin extending laterally from the upper end of the body, and the upper clamping means having a slot therein to receive the pin for securing the upper clamping member to the body, and to allow movement thereof to positions to cover and uncover the stopper to prevent and allow removal of the latter.

SIGISMUND BUJNICKI.